United States Patent
Oweis et al.

(10) Patent No.: US 9,336,020 B1
(45) Date of Patent: May 10, 2016

(54) WORKFLOWS WITH API IDIOSYNCRASY TRANSLATION LAYERS

(71) Applicant: Amazon Technologies, Inc., Reno, NV (US)

(72) Inventors: Marwan Salah Oweis, Olney, VA (US); Jason Bradley Goelitz, Oakton, VA (US); Patrick Brigham Cullen, Herndon, VA (US)

(73) Assignee: Amazon Technologies, Inc., Reno, NV (US)

(*) Notice: Subject to any disclaimer, the term of this patent is extended or adjusted under 35 U.S.C. 154(b) by 358 days.

(21) Appl. No.: 14/083,172

(22) Filed: Nov. 18, 2013

(51) Int. Cl.
| | |
|---|---|
| G06F 9/24 | (2006.01) |
| G06F 15/177 | (2006.01) |
| G06F 9/445 | (2006.01) |
| G06F 9/44 | (2006.01) |
| H04L 29/08 | (2006.01) |
| H04L 12/24 | (2006.01) |

(52) U.S. Cl.
CPC .............. G06F 9/44505 (2013.01); *G06F 8/00* (2013.01); *H04L 41/0803* (2013.01); *H04L 67/125* (2013.01)

(58) Field of Classification Search
CPC ...... H04L 41/0803; H04L 67/125; G06F 8/00
USPC .................................................. 713/1, 2, 100
See application file for complete search history.

(56) References Cited

U.S. PATENT DOCUMENTS 8,161,100 B1 * 4/2012 Lopez .................. H04W 4/001
                                                    709/203
2013/0212234 A1 * 8/2013 Bartlett .............. G06Q 10/0633
                                                    709/220

* cited by examiner

*Primary Examiner* — Michael J Brown
(74) *Attorney, Agent, or Firm* — Baker & Hostetler LLP

(57) ABSTRACT

User actions for configuring a computing environment may be recorded and converted to a workflow definition. A translation layer may be associated with the workflow definition and invoked to perform actions described by the workflow by utilizing one or more application programming interfaces. The translation layer may adapt to application programming interface idiosyncrasies by translating state transitions, including asynchronous to synchronous state transitions and synchronous to asynchronous state transitions.

20 Claims, 9 Drawing Sheets

WORKFLOWS WITH API IDIOSYNCRASY TRANSLATION LAYERS

BACKGROUND

Computer programmers may utilize application programming interfaces ("APIs") to write programs to perform various functions. The APIs may be provided by various third parties or other entities not under the control of the consumer of the API. Even when used to perform similar functions, the APIs provided by these entities may exhibit large or small variances in behavior. These idiosyncrasies may prevent one API from being easily substituted for another, even when the APIs otherwise perform identical functions.

One area in which this pattern may occur involves performing configuration tasks. An administrator or other user of a computing system may initiate various configuration tasks. When these tasks are executed on the computing system, APIs provided by various vendors may be used to perform the underlying configuration tasks. Because of differences in hardware configuration, operating systems and other factors, the APIs used may exhibit a wide variety of behaviors. As a result, it may be challenging for programmers to develop automated approaches to performing these administrative tasks.

BRIEF DESCRIPTION OF DRAWINGS

The drawings provided herein are designed to illustrate example embodiments and are not intended to limit the scope of the disclosure.

DETAILED DESCRIPTION

Figure 1:
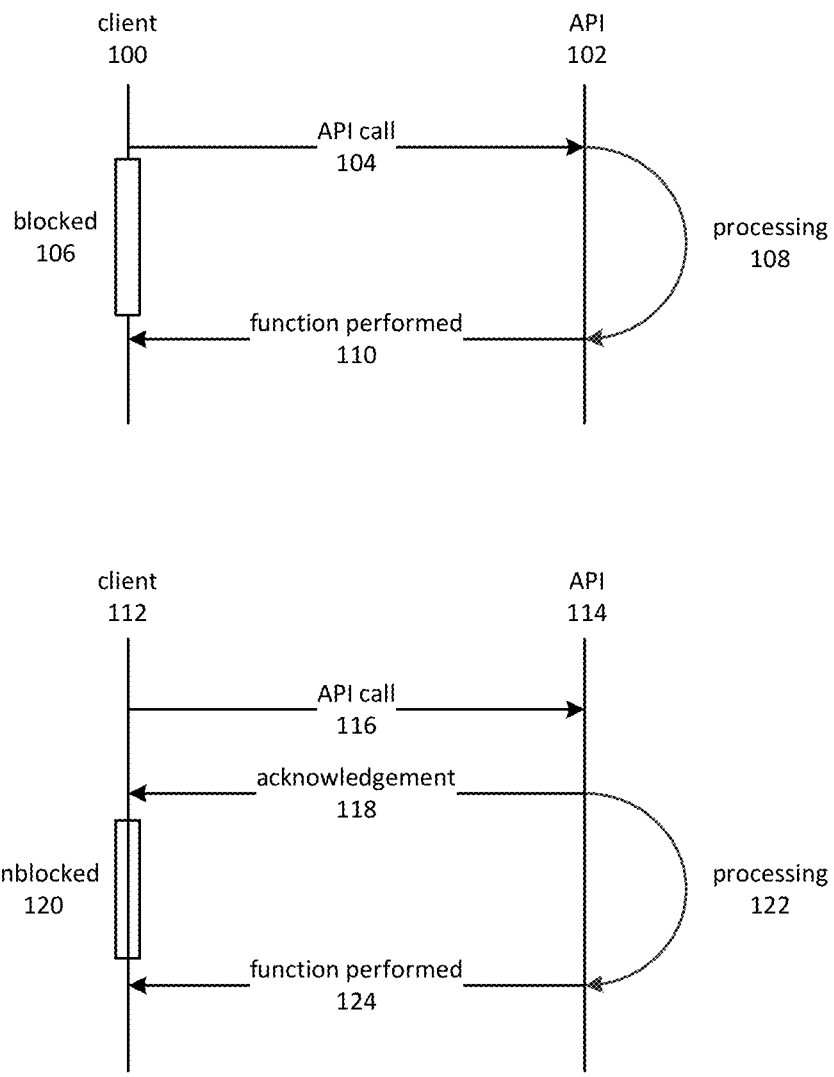
FIG. 1 is a diagram depicting an illustrative example of an API idiosyncrasy involving synchronous versus asynchronous behavior.

An application programming interface ("API") may comprise a set of functions, methods or protocols that perform various functions on behalf of a calling process. Any API may be associated with a set of functionality and a manner of interaction. The set of functionality is indicative of the functions that the API may perform on behalf of a caller. Examples include sending an email, scheduling a workflow, printing a document and so on. The manner of interaction refers to how a calling process goes about interacting with the API. In some cases, APIs may adhere to some well-known or otherwise publicized manner of interacting with the API. For example, the method signatures of the API may be documented and published. Some APIs, however, may be considered private. These APIs may generally be intended to be used by those who have been made aware of the functionality of the API and the manner in which that functionality may be invoked. In some cases, a standardized manner of interacting with an API may be used. Examples include hypertext transfer protocol ("HTTP"), extensible markup language ("XML"), representational state transfer ("REST"), asynchronous JAVASCRIPT ("Ajax"), JAVASCRIPT object notation ("JSON"), component object model ("COM") and so on. Standards may be designed to facilitate interaction with an API, for example by defining techniques for exchanging data.

Even with the use of standards such as HTTP, there exist many possible variations in functions that may be performed by an API and in the manners in which a client process may interact with an API. This may be the case even for APIs that perform similar functions. One case involves APIs that rely on callback mechanisms to provide state change notifications. For example, a function of an API might be invoked to retrieve data. The API function might return immediately, and a callback function invoked subsequently once the data becomes available. In contract, another API might retrieve the same data, but simply not return until the function has been fully performed. The API that utilizes a callback mechanism involves a greater number of states than an equivalent API without a callback mechanism. Similar examples may be seen involving semaphores, mutexes, and other synchronization mechanisms.

Another example of a type of operation that may exhibit different behaviors when performing otherwise equivalent functions involves eventually consistent data. An API might provide a function to update data stored in a distributed database system. A master database in such a system might be updated when the function is first invoked, while a replicated database might still contain an outdated copy of the same data. The data is therefore inconsistent, but will eventually become consistent. On the other hand, an alternative implementation of the API might update both the master database and the replica contemporaneously. Yet another example involves differences in expected state transitions. To illustrate, one API might transition through connected or initialized states prior to performing a function, while a second API might allow the function to be performed without first transitioning through connected or initialized states.

FIG. 1 depicts one example of an API idiosyncrasy. The term API idiosyncrasy may be defined as a behavior difference exhibit between different versions of an API, or a subset of an API, that performs a similar function. Examples of API behavioral differences include those described above, such as state transitions, callbacks, blocking behavior and the like.

In the example of FIG. 1, client 100 may invoke API call 104 to perform some function of API 102. While the function is being performed, execution of client 100 may be blocked 106. In some embodiments, this may involve a thread of client 100 being blocked until processing 108 has completed and an indication that the function has been fully performed 110 is returned to client 100.

API 114 may provide API call 116 to perform the same function as API call 104 in API 102. However, even though the function performed by API call 104 and API call 116 is the same, there may be various idiosyncratic behavioral differences in how the function is performed. For example, client 112 might invoke API call 116 to perform the function. API 114 might synchronously return an acknowledgement 118 prior to fully performing the function. API 114 might then complete processing 122 and then send a response indicating that the function has been performed 124 to client 112. In the meantime, client 112 may be unblocked 120, or in other words able to continue to perform various other operations while API 114 is performing the function.

Figure 2:
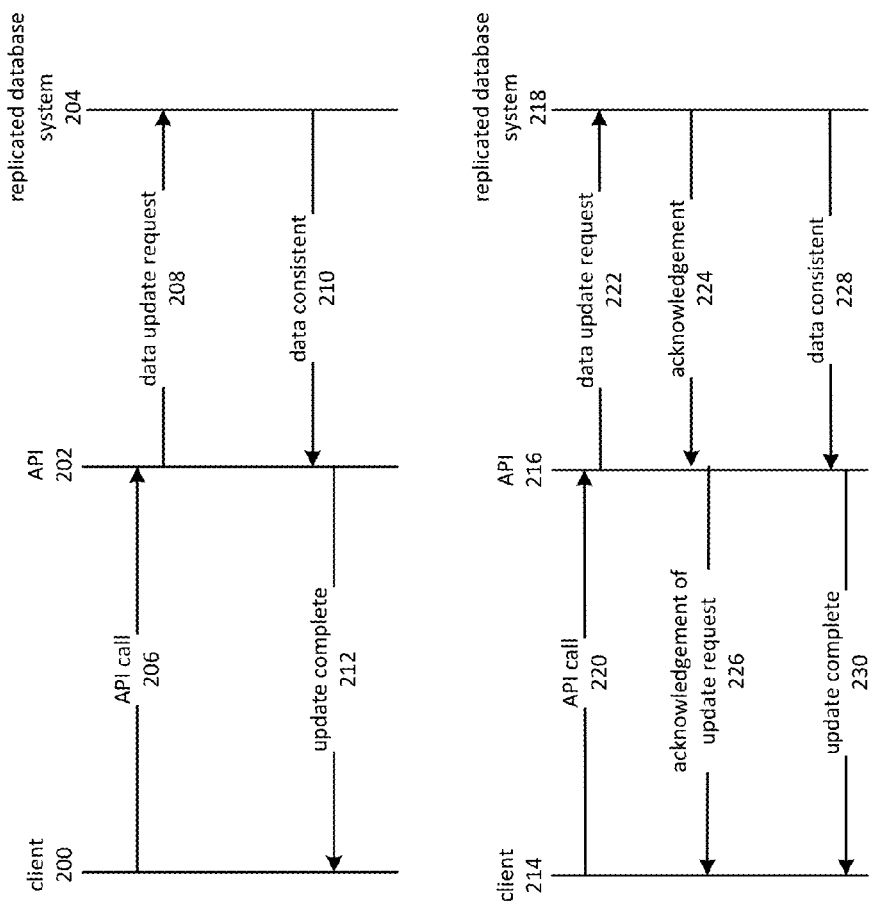
FIG. 2 is a diagram depicting an illustrative example of an API idiosyncrasy related to eventual consistency of data.

FIG. 2 depicts another example of an API idiosyncrasy. A client 200 may invoke API call 206 of API 202 in order to update data in replicated database 204. To perform this function, API 202 may send data update request 208 to replicated database system 204. In replicated database system 204, at least two copies of the data may exist, one of which may be updated immediately upon receipt of data update request 208. The other copy of the data, however, may be updated some time later, rendering the two copies indeterminate for some period of time. However, in this case API call 206 does not return an indication that data is now consistent 210 and the update is complete 212 to client 200 until the two copies of data are consistent.

API 216 may support API call 220 to perform the same update function performed by API call 206. However, the behavior of API 216 may be idiosyncratic as compared to API 202. When processing API call 220, API 216 may send data update request 222 to replicated database system 218. API 216 might receive an acknowledgement 224 from replicated database system 218 indicating that the request to update data has been received but not completed. This may occur, as one example, when one copy of the data has been updated but another copy has not. In response to receiving acknowledgement 224, API 216 may send a similar acknowledgement message 226 to client 214. At some later time, replicated database system 218 may send a message indicating that the data is fully consistent 228 to API 216. In some embodiments, API 216 may poll replicated database system 218 to determine whether or not the data has become consistent. After the data has become consistent, a message indicating that the update is fully complete 230 may be sent to client 214.

The examples given are intended to be illustrative of idiosyncratic behavioral differences that may exhibited by various APIs. Many additional idiosyncratic behaviors may be encountered. However, idiosyncratic behavioral differences may be generalized as involving a difference in possible states of the APIs being compared. For example, a synchronous API may be considered equivalent to a state machine having the possible states {"processing," "complete," "failed"}, while an asynchronous API may be considered equivalent to a state machine having the possible states {"acknowledged," "processing," "complete," "failed"}.

Figure 3:
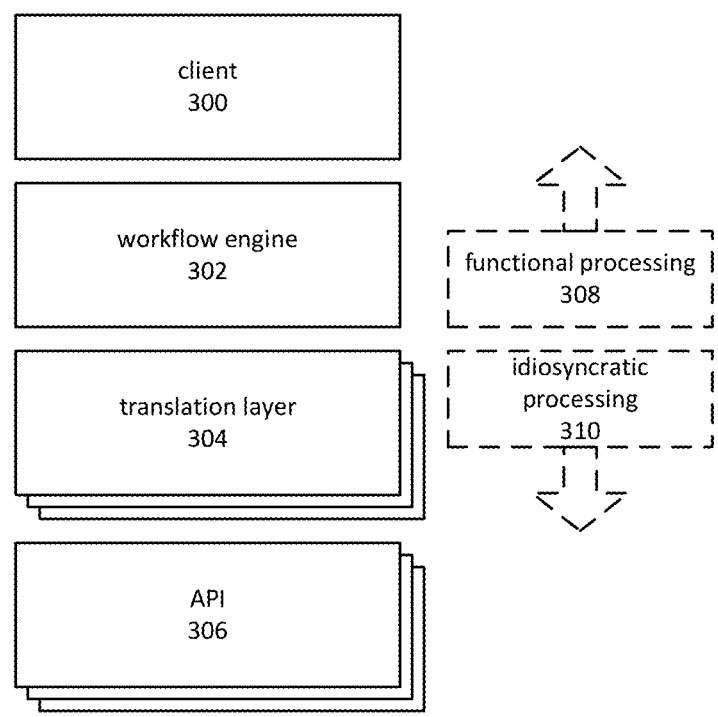
FIG. 3 is a block diagram of a system for normalizing API idiosyncrasies.

Embodiments may perform translation of idiosyncratic behaviors by mapping between the states of actual APIs and a set of normalized states, where normalized states may be defined as those that are expected by a client process that issues requests to perform various functions, but is not aware of the idiosyncrasies of the underlying API. One example of an embodiment for performing normalization, and other forms of translation, of idiosyncrasies is depicted by FIG. 3. A client 300 may comprise a process or component that indirectly requests that functions be performed on its behalf by one or more APIs 306. The actions of the client may be directed by a user, or may be autonomously performed.

The actions of the client may be captured or reflected in a workflow definition to be processed by workflow engine 302. A workflow definition may contain information indicative of a sequence of actions to be performed, possibly including information related to dependencies between the actions. Workflow definitions may also comprise information concerning potential failure conditions and procedures for rolling back changes made during execution of the workflow. Embodiments may also contain information indicative of various artifacts created by performing the workflow.

As depicted in FIG. 3, certain types of processing may be performed by client 300 and/or workflow engine 302. This type of processing may be defined as functional processing 308. One way of describing functional processing 308 in general terms is that it may refer to processing driven by descriptive or declarative information that may be received from a user or contained in a workflow definition. For example, a user might initiate a request to instantiate a new virtual computing environment. This information might be recorded in a workflow definition as a declaration that the new virtual computing environment should be instantiated, but without describing the specific steps—such as API calls— that would perform this function. Functional processing is therefore isolated from the idiosyncratic behaviors found in various APIs.

Idiosyncratic processing, on the other hand, may be described as processing that reflects the idiosyncratic nature of various APIs, and includes invocations of API calls that perform the desired function. This type of idiosyncratic processing may be performed by translation layer 304 and APIs 306.

Separation of functional processing 308 from idiosyncratic processing 310 may by employed in various embodiments to record and replay various actions taken by client 300. When idiosyncratic processing is removed from client 300 and workflow engine 302, it may be possible to record information indicative of the functional actions performed, without needing to differentiate between idiosyncratic and non-idiosyncratic behavior. For example, a workflow definition may be formed based on actions taken by a user of client 300, and may contain only a high-level, functional description of the actions taken. The workflow definition may omit logic or parameters that are related only to the idiosyncratic behavior of a particular API. A wide variety of formats may be employed to represent the workflow definition. These may include compiled code, intermediate code, XML and so forth.

One or more translation layers 304 may perform translation between functional processing defined in client 300 and/or workflow engine 302. An individual translation layer may comprise one or more libraries, components, blocks of code and so forth. These may be configured to interoperate with one or more APIs 306, in order to counter API idiosyncrasies and perform functions on behalf of client 300 and/or workflow engine 302.

Some embodiments may omit components of FIG. 3 such as client 300 and workflow engine 302. For example, a process of client 300 may interact directly with translation layer 304, instead of interacting through workflow engine 302.

Figure 4:
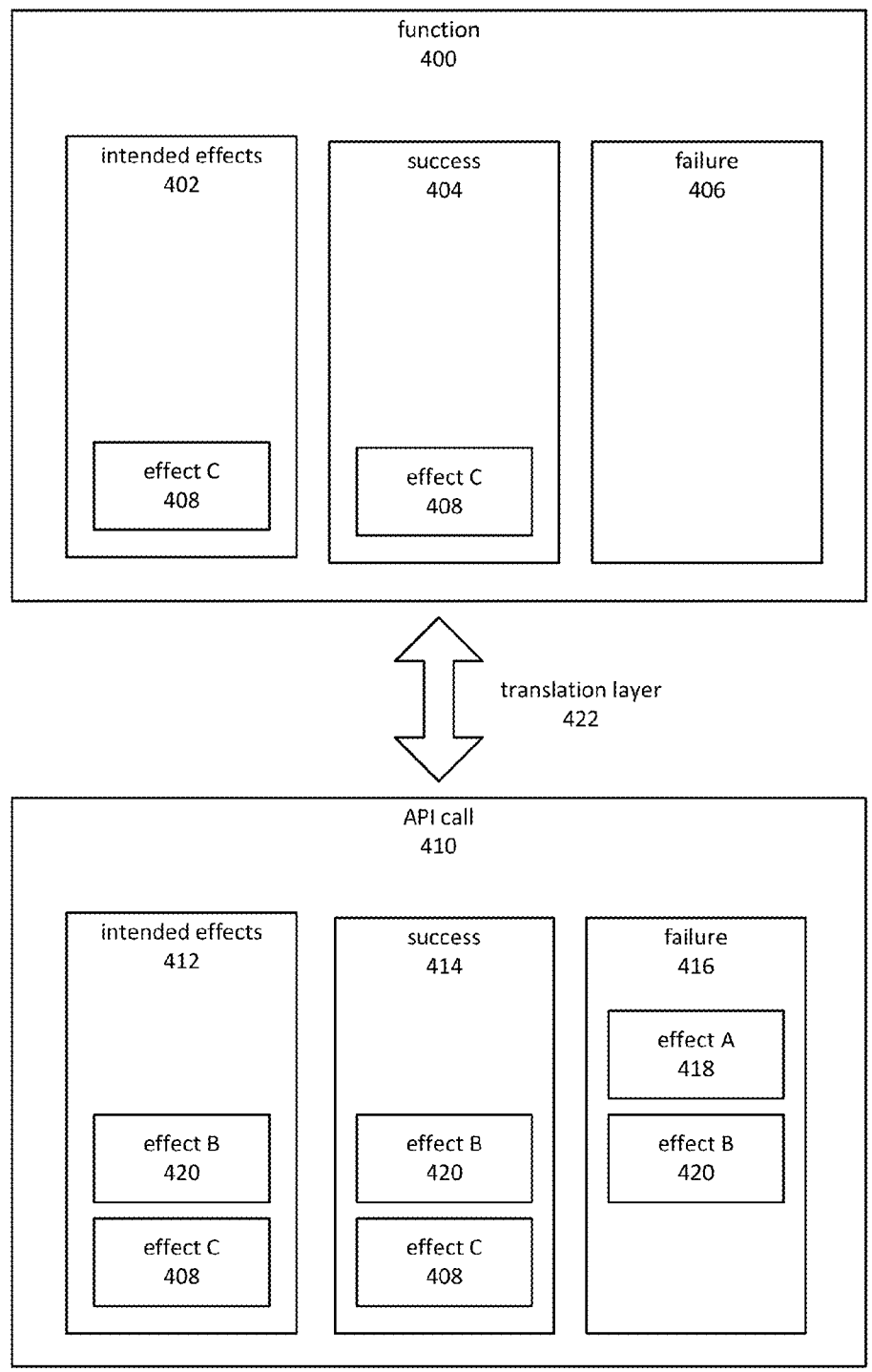
FIG. 4 is a block diagram depicting an illustrative example of mapping between failure states.

In order to isolate idiosyncrasies, embodiments may perform a mapping between states that may be encountered on the level of functional processing and those that may be encountered at the idiosyncratic level. One type of mapping involves potential error states. Embodiments may map between error states by mapping potential error states and managing artifact creation and rollback. FIG. 4 depicts an example of mapping error states. In FIG. 4, a client and/or workflow definition may, at the functional-level, perform a function 400. Performance of function 400 may produce one or more intended effects 402, such as effect C 408. In the event that performance of function 400 results in success 404, effect C 408 may be achieved. However, in the event that failure 406 results, effect C 408 may not be achieved. Furthermore, there may be an expectation at the functional level of processing that failure 406 will not result in any additional effects. As used herein, the term effect may refer to a result or artifact of performing a function, whether desired or not.

API call 410 may be invoked to perform the underlying work. However, API call 410 may be associated with a different set of intended effects 412, such as effect B 420 and effect C 408. Should API call 410 result in success 414, both effect B 420 and effect C 408 may be achieved. However, should invocation of API call 410 result in failure 416, one possible outcome is that unintended effect A 418 might result, as well as effect B 420, but not effect C 408.

Mapping failure states may comprise a translation layer 422 that manages differences in various effects that may result from a failure condition. In the example of FIG. 4, this may comprise negating effect A 418 and effect B 420, so that the state expected by function 400 in the event of failure 406 is achieved. In some cases, it may be known that an effect, such as effect A 418, is of no consequence to the operation of function 400 or other processing at the functional level. If so, when mapping error states embodiments may ignore negating effect A 418. Conversely, if it is the case that effect B 420 is of consequence to the processing at the functional level, embodiments may negate effect B 420. An embodiment might also negate effect B 420 in the event that processing of API call 410 results in success 414, because effect B 420 is not expected on the functional level, as depicted by success state 404. In general terms, determining to negate an effect may be based on the consequence of the effect to processing at the functional level and/or whether or not the effect is expected.

Figure 5:
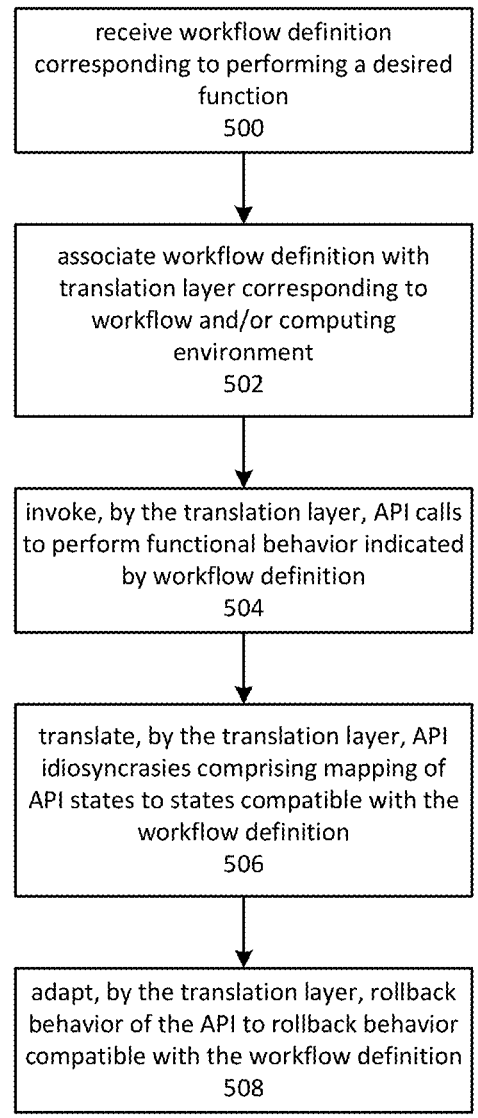
FIG. 5 is a flowchart depicting an embodiment of a process for performing a function using a workflow definition and a translation layer that adapts to API idiosyncrasies.

FIG. 5 depicts an embodiment of a process for performing a desired function using workflow definitions and a translation layer that adapts to idiosyncratic API behavior. Although depicted as a series of operations, those of ordinary skill in the art will appreciate that the depicted operations are intended to be illustrative of a possible embodiment and that in other embodiments at least some of the depicted operations may be altered, omitted, reordered or performed in parallel.

A translation layer may comprise one or more software modules containing functions, methods or protocols that may be invoked during execution of a workflow. A software module may comprise a static or dynamic library of software routines, a business object, a component and so forth. As used herein, the terms translation layer and translation module may be used interchangeably.

At operation 500, A workflow definition may be received. The workflow definition may correspond to performing a desired function or series of functions. A workflow definition may comprise declarations of dependencies between functions. In some embodiments, a workflow definition may specify control flow operations to determine which of a set of desired functions is performed. For example, a workflow definition may specify a path of execution to be taken in the event that an error occurs.

A workflow definition may reflect various assumptions concerning the state of the system on which it operates. The system on which a workflow definition operates may be a computing environment or other system that is affected by performance of functions specified in a workflow definition. The expected state may be related to the state of the system following successful performance of a function specified in a workflow definition, or following an unsuccessful attempt to perform a function. The set of states expected by a workflow definition may be referred to as states known to a workflow definition. More generally, compatible states may be defined as those states that are either known to a workflow definition or those that are compatible with performance of the functions specified by a workflow definition. As used herein, the terms "expected states," "known states," and "compatible states" are used interchangeably.

Operation 502 depicts associating a workflow definition with a translation layer. The translation layer may translate from states known to the workflow definition and those produced by executing underlying API methods. Various approaches may be employed to associate a workflow definition with a translation layer. Embodiments may, for example, assign workflow definitions to translation layers on a one to one basis. The assignment may be based on compatibility with the workflow definition and/or the computing environment on which the workflow will be performed. Some embodiments may dynamically assign a translation layer based on factors such as the computing environment on which the workflow will be performed. Embodiments may also base associations between workflow definitions and translation layers on factors such as characteristics of the workflow definition. For example, embodiments may associate one or more translation layers to a workflow definition based on the functions to be performed by executing the defined workflow. Accordingly, associating a translation layer to a workflow definition may comprise associating one or more functions to be performed, as indicated in a workflow definition, with a translation layer. Associations may also be made between functions to be performed and entry points (e.g., function or method calls) of a translation layer.

Instructions contained in a translation layer may be mapped to various entry points of a translation layer. For example, a workflow definition may comprise one or more identifiers corresponding to functional actions to be performed when the workflow is executed. These identifiers may be associated, possibly through various levels of indirection, to entry points in the translation layer.

Based on an association between a workflow definition and a translation layer, functions specified by the workflow definition may be performed using a translation layer and an underlying API. Interpretation or execution of the workflow definition may result in invocation of one or more entry points of the translation layer. The translation layer may then invoke underlying API methods. Operation 504 depicts invoking, by the translation layer, API methods to perform the functional behavior described by the workflow definition.

Operation 506 depicts translating API idiosyncrasies. This may comprise mapping from the states of one or more APIs being invoked to a set of states known or compatible with performing the functions of the workflow definition. Two classes of API idiosyncrasies that may be translated are asynchronous state transitions and synchronous state transitions. An asynchronous state transition may involve callback functions or other techniques for transitioning state at some point in time beyond the initiation of the event that triggered the state change. Synchronous state transitions, on the other hand, occur when state occurs contemporaneously with the initiating event. For example, a call to an initialize function may be considered synchronous when the corresponding API transitions from an uninitialized state to an initialized state during execution of the initialize function.

Operation 508 depicts adapting rollback behavior of one or more APIs being invoked to rollback behavior known to or compatible with the workflow definition. Embodiments may, for example, remove artifacts created by the failed execution of an API method when the artifact is incompatible with the functional behavior described by an associated workflow definition. Rollback may therefore be employed to reverse changes to a computing environment when artifacts are left over following a failure.

Figure 6:
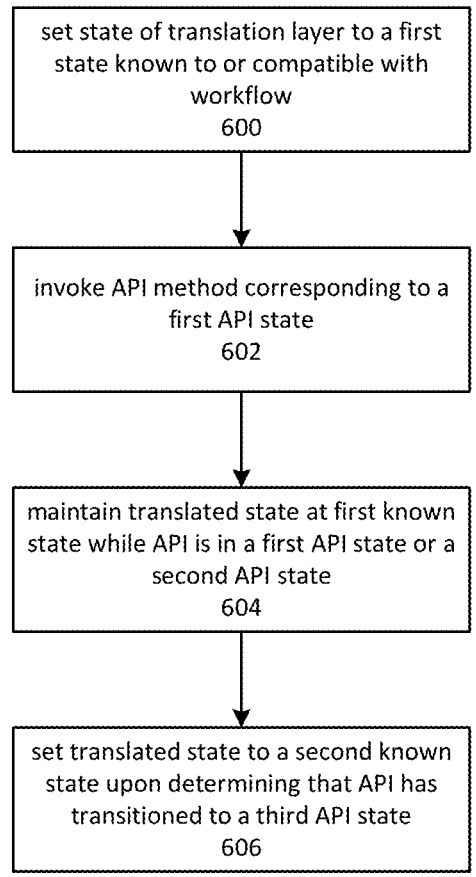
FIG. 6 is a flowchart depicting an embodiment of a process for mapping between idiosyncratic states of an API and those expected by or compatible with performance of a workflow definition.

FIG. 6 depicts an embodiment of a process for mapping between states of an API and those expected by or compatible with a workflow definition. Although depicted as a series of operations, those of ordinary skill in the art will appreciate that the depicted operations are intended to be illustrative of a possible embodiment and that in other embodiments at least some of the depicted operations may be altered, omitted, reordered or performed in parallel.

Operation 600 depicts setting the translation layer state to a first state known to or expected by the workflow. For example, processing of a workflow may require that a translation layer be in an initialized state upon commencement of the workflow, without a need to call a specific initialization function.

The translation layer may maintain an explicit or implied state that corresponds to a state known to or compatible with the workflow definition. An explicit state may comprise a flag, variable or other indicator of a state. An implied state may correspond to behavior of the translation layer, with respect to the workflow definition, while in that state. For example, a first workflow state might correspond to the initial invocation of a translation layer method, and a second workflow state might correspond to the completed invocation of that method. These states may be represented implicitly, rather than through the use of a variable or other indicator that explicitly corresponds to the state of the workflow.

Operation 602 depicts invoking an API method corresponding to a first API state. The API state may be distinct from that of the workflow state. For example, an API may require that initialization or connection methods be called prior to utilizing other API functions, whereas the workflow may be unaware of the need to perform an initialization. Accordingly, the API may have a state transition from uninitialized to initialized, while logic expressed in a workflow definition would be unaware of this state transition.

Operation 604 depicts maintaining a first state with respect to the workflow while the API transitions from a first to a second state. In other words, the behavior of the translation layer will reflect the state expected by the workflow during the course of transitioning between API states.

Operation 606 depicts setting the translated state to a second known state upon determining that the API has transitioned to an API state corresponding to the second known state. This may occur, for example, when the API transitions to a state corresponding to completing performance of a function requested by performance of a workflow definition. For example, the workflow might express a functional-level instruction pertaining to configuring a computing environment. This might involve a lengthy step such as reformatting a hard drive, rebooting a computing system and so forth. These actions might be invoked through various APIs, which may transition through various states while the operations are performed. The translation layer, however, may remain in a single state while the configuration action is performed.

Figure 7:
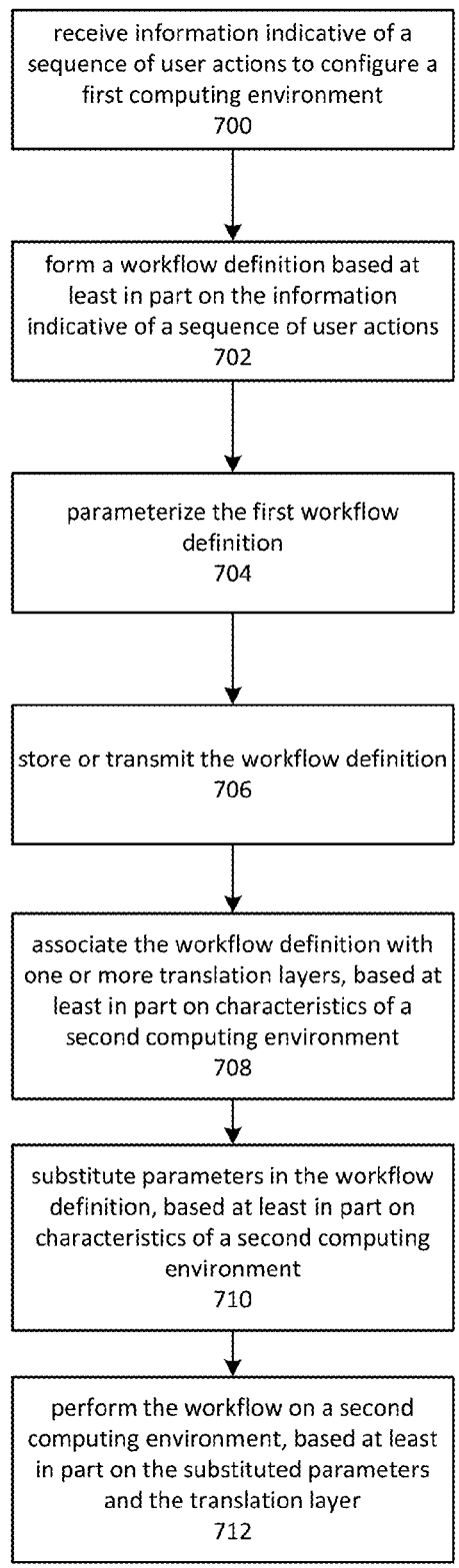
FIG. 7 is a flowchart depicting an embodiment of a process for recording and replaying sequences of actions, using a translation layer.

Embodiments may employ aspects of the present disclosure to record and replay sequences of actions. FIG. 7 depicts an example of an embodiment for recording and replaying a sequence of actions performed by a user. Although depicted as a series of operations, those of ordinary skill in the art will appreciate that the depicted operations are intended to be illustrative of a possible embodiment and that in other embodiments at least some of the depicted operations may be altered, omitted, reordered or performed in parallel.

At operation 700, a computing process may receive information indicative of a sequence of user actions to configure a computing environment, or to perform some other computing task. The information may be received from the same computing process or another computing process. In an embodiment, a computing process may receive a sequence of user actions through a web service interface. In another embodiment, a computing process may receive the information through events indicative of keyboard and mouse events. Those of ordinary skill in the art will appreciate that many alternative embodiments are possible.

Based on the information indicative of a sequence of user actions, a workflow definition may be formed to represent at least a subset of the user actions, as depicted by operation 702. In some embodiments, the workflow definition may be formed prior to or contemporaneously with performing the sequence of user actions to configure a computing environment. Embodiments may, for example, form the workflow definition and then execute it in conjunction with the actions of a translation layer suitable for use with the computing environment being configured.

Operation 704 depicts parameterizing the workflow definition. This may be done contemporaneously with forming the workflow definition. Parameterization refers to identifying variables or other values used in the workflow that are specific to the computing environment on which the user is operating.

Operation 706 depicts storing and/or transmitting the workflow definition for later use. Embodiments may store the workflow definition on any suitable medium. Embodiments may transmit the workflow definition to another computing process, where it may be performed, stored, or retransmitted. Embodiments may also transmit the workflow definition to another user. In an embodiment, a sequence of actions is performed on a first computing environment and also transmitted to a second computing environment, where it is also performed. The second computing environment is thereby configured in a manner similar to the first computing environment.

Operation 708 depicts associating the workflow definition with one or more translation layers. Embodiments may associate the workflow definition with a translation layer based on characteristics of a second computing environment. The translation layer may be the same as a translation layer used in configuring the first computing environment in response to the user actions. In some embodiments, the translation layer for the second computing environment may be independent of the translation layer used with the first computing environment. For the purpose of illustrating one of many possible embodiments, FIG. 7 depicts associating the translation layer with the workflow definition based at least in part on one or more characteristics of a second computing environment. A characteristic may be any factor relevant to performance of the workflow definition, such as the type of database system used in the second computing environment. In various cases and embodiments, multiple translation layers may be associated with a workflow definition. This may occur, for example, when the workflow definition describes functions to be performed that, post-translation, involve the use of multiple APIs.

Operation 710 depicts substituting parameters in the workflow definition. These may correspond to the parameterization operation performed at operation 704. The parameter values used may be selected based on a wide variety of factors. For the purpose of illustrating one of many potential embodiments, FIG. 7 depicts selecting the values based on a characteristic of the second computing environment.

At operation 712, the workflow may be performed on the second computing environment, to perform configuration operations on the second computing environment that are similar to those performed on the first computing environment. The workflow may be performed using the associated translation layer and the substituted parameter values.

Figure 8:
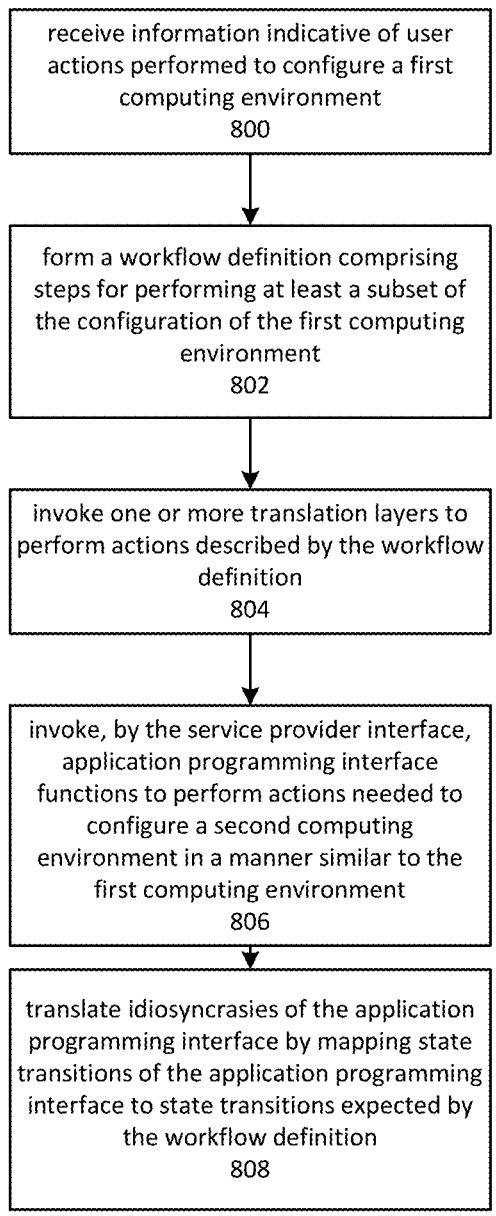
FIG. 8 is a flowchart depicting an embodiment of a process for recording a sequence of user actions for configuring a computing environment and using the sequence to configure additional computing environments.

FIG. 8 depicts an alternative view of an embodiment for recording and replaying actions performed to configure a first computing environment. Although depicted as a series of operations, those of ordinary skill in the art will appreciate that the depicted operations are intended to be illustrative of a possible embodiment and that in other embodiments at least some of the depicted operations may be altered, omitted, reordered or performed in parallel. In addition, FIG. 8 depicts an operation related to configuring a computing environment in order to provide an illustrative example of an application of the present disclosure. The use of this example should not be construed as limiting the intended scope of the disclosure.

Operations 800 and 802 depict forming a workflow definition based in part on a series of actions performed by a user to configure a computing environment. The actions performed by a user, or by a computing process, to configure a computing environment may be recorded. Some or all of the recorded actions may be used as the basis for a workflow definition that describes various functions that must be performed in order to complete the configuration actions. Embodiments may receive information from a user or process that is indicative of one or more actions to be performed in configuring the computing environment. Rather than directly invoking one or more APIs to accomplish the requested configuration, embodiments may translate the information and embed it into a workflow definition. Operation 802 depicts forming a workflow definition. The actions to be performed to configure the computing environment may be entered into a workflow definition as declarative actions, as function calls, instructions sequences, and so forth. Accordingly, the workflow definition may, in some embodiments, comprise a format for recording information corresponding to a sequence of actions by a user or process. Control logic may be embedded into the formed workflow definition, in addition to recorded actions. A workflow definition may be recorded in a human-readable format such as XML, and may be edited to add steps, remove steps, add control logic and so on.

Operation 804 depicts invoking one or more translation layers to perform the actions described by a workflow definition. Embodiments may utilize a registration process to associate a workflow definition with a translation layer to be invoked when the workflow is to be performed. The registration may be recorded internally in the workflow definition. In some embodiments, a database or registry may be utilized. Various forms of indirection may also be utilized by some embodiments. For example, a workflow definition might include an identifier, and a registry might map from the identifier to a suitable translation layer. Another possible technique associating a workflow definition with a translation layer involves selecting an appropriate translation layer based on the environment in which the workflow is to be performed. In some cases and embodiments, multiple translation layers may be invoked to perform actions described by a workflow definition.

Embodiments may, after identifying an appropriate translation layer, invoke functional-level methods of the translation layer, as depicted by operation 804, to cause idiosyncratic processing to be performed. The functional-level methods may be termed a service provider interface, which may be implemented by a translation layer. Operation 806 depicts invoking, by a service provider interface to perform actions needed to configure a computing environment using the actions described in a workflow definition. The workflow definition, if recorded while a user configures a first computing environment, may be utilized to configure a second computing environment in a manner similar to the first.

An implementation of a service provider interface may perform translation between the functional-level service provider interface and the idiosyncratic behaviors of APIs that perform the indicated functions. As depicted by operation 808, idiosyncrasies of application programming interfaces may be translated by mapping state transitions of the application programming interface to state transitions expected by the workflow definition. For example, translation may comprise mapping asynchronous state transitions of application programming interface functions to synchronous state transitions of the service provider interface. Another possibility is mapping synchronous state transitions of application programming interface functions to asynchronous state transitions of the service provider interface.

Embodiments of the present disclosure may be practiced in conjunction with hosted computing environments. A virtual machine, virtual network, data store, databases and the like may be hosted by a provider on behalf of the provider's customers. Various combinations of these elements may be described as a server instance, a computing environment instance or simply as a computing environment. A computing environment may be created, modified and maintained by a provider on behalf of a customer. For convenience, these and similar operations may be described as configuring the computing environment. A provider may expose various APIs to the customer in order to facilitate configuration of the customer's computing environments. The APIs may be exposed through a web service or similar mechanism. Different environments may have APIs that perform similar functions, such as creating a new computing environment, but exhibit various idiosyncrasies. The idiosyncrasies may stem from various factors such as differences in hardware, or in the engineering practices of the groups that produce the APIs.

Translation layers may be implemented in conjunction with defining workflows or other mechanisms for invoking functional-level entry points on the translation layer, such as applications, business objects and the like. In various embodiments, the entry point to the translation layer may be treated as a trace point for the purpose of recording sequences of user actions. The translation layer entry points may reflect functional behavior. Accordingly, a sequence of actions recorded based on entry points to the translation layer may reflect the intent of the sequence of actions, rather than reflecting various idiosyncratic API behaviors. The recorded sequence of actions may then be converted into a workflow definition. Parameter identification may be performed by extracting the parameters passed to the translation layer entry points, and recorded in the workflow definition. Embodiments may analyze or map the parameter values to identify a subset of the parameter values that may be modified to adapt to performing the workflow in an environment other than that in which it was initially executed.

Proven workflows may be stored in a repository or database, or otherwise made available to customers. When made available in a hosted environment, the workflows may be shared between customers as a means of reusing proven sequences of actions. In this manner, customers may avoid experimentation when setting up new computing environments or modifying existing environments. Embodiments may remove security-sensitive information from a workflow definition prior to sharing.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 9:
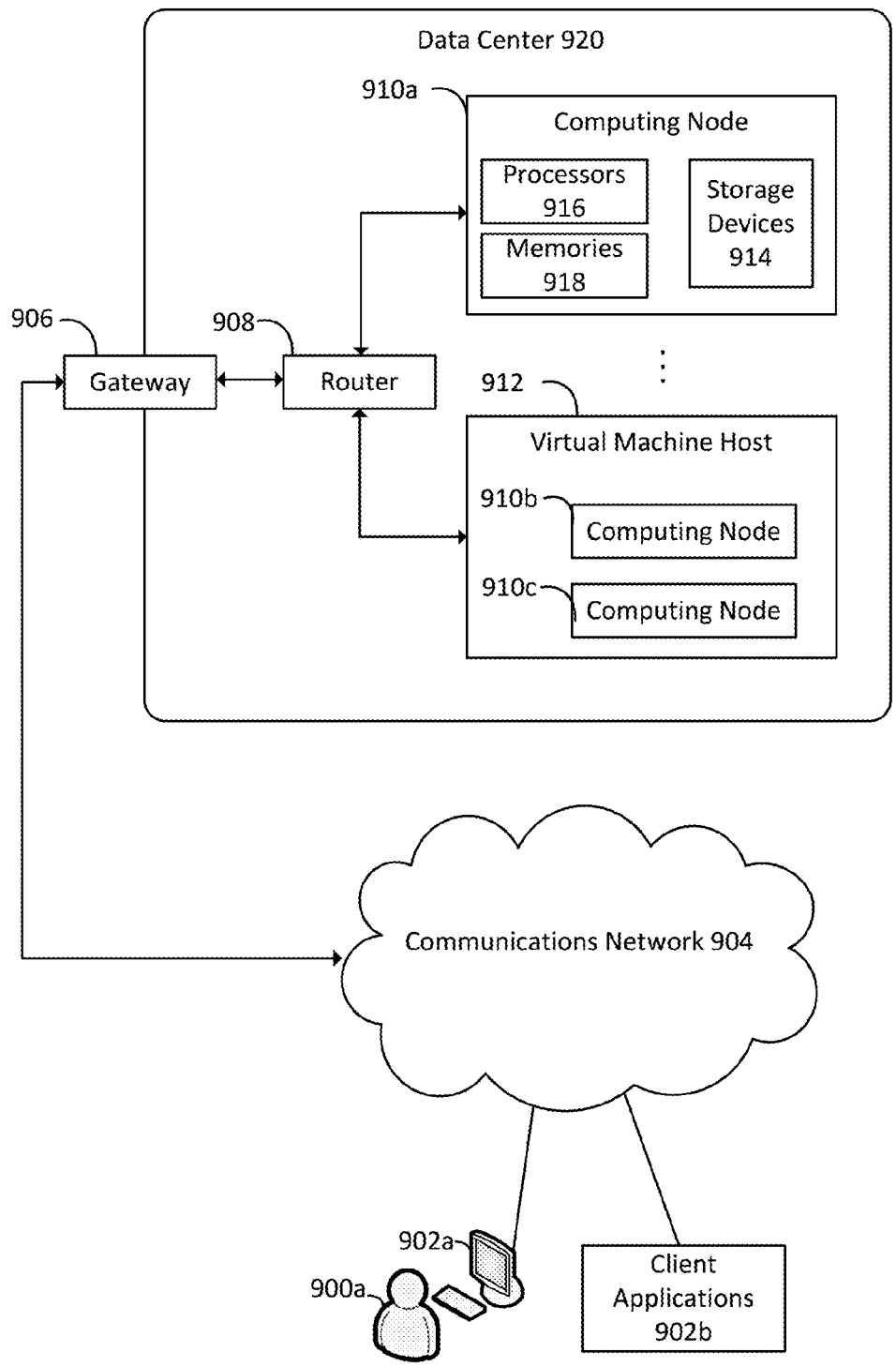
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b and 910c within a data center 920. Alternatively, client applications 902b may communicate without user intervention. Communications network 904 may comprise any combination of communications technology, including the Internet, wired and wireless local area networks, fiber optic networks, satellite communications and so forth. Any number of networking protocols may be employed.

Communication with processes executing on the computing nodes 910a, 910b and 910c, operating within data center 920, may be provided via gateway 906 and router 908. Numerous other network configurations may also be employed. Although not explicitly depicted in FIG. 9, various authentication mechanisms, web service layers, business objects or other intermediate layers may be provided to mediate communication with the processes executing on computing nodes 910a, 910b and 910c. Some of these intermediate layers may themselves comprise processes executing on one or more of the computing nodes. Computing nodes 910a, 910b and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918 and one or more storage devices 914. Processes on computing node 910a may execute in conjunction with an operating system or alternatively may execute as a bare-metal process that directly interacts with physical resources such as processors 916, memories 918 or storage devices 914.

Computing nodes 910b and 910c are depicted as operating on virtual machine host 912, which may provide shared access to various physical resources such as physical processors, memory and storage devices. Any number of virtualization mechanisms might be employed to host the computing nodes.

The various computing nodes depicted in FIG. 9 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices such as cell phones, smartphones, tables, embedded device, and so on. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a first computing environment;
a second one or more computing environments;
one or more computing nodes configured at least to:
   receive information indicative of one or more user actions for configuring the first computing environment;
   form a workflow definition comprising information indicative of at least one action for configuring at least one of the first computing environment or the second one or more computing environments, the at least one action based at least in part on the one or more user actions for configuring the first computing environment;
   associate at least one translation module with the workflow definition, the associating based at least in part on receiving a request to configure the second one or more computing environments;
   invoke, by the at least one translation module, one or more application programming interface functions corresponding to performing the at least one action for configuring at least one of the first computing environment or the second one or more computing environments; and
   translate, by the translation module, one or more behavioral differences of the one or more application programming interface functions, the translating comprising at least one of mapping a first asynchronous state transition of the one or more application programming interface functions to a first synchronous state transition of the at least one translation module, or mapping a second synchronous state transition of the one or more application programming interface functions to a second asynchronous state transition of the at least one translation module.

2. The system of claim 1, the one or more computing nodes further configured at least to:
   store the workflow definition in a repository, the repository comprising a plurality of stored workflow definitions; and
   retrieve the workflow definition from the repository, the retrieving based at least in part on properties of the second computing environment.

3. The system of claim 1, the one or more computing nodes further configured at least to:
   associate one or more parameter values with parameters of the workflow definition, the one or more parameter values based at least in part on properties of the second one or more computing environments.

4. The system of claim 1, wherein the one or more behavioral differences comprise eventual consistency of updates and the first asynchronous state transition comprises a transition from an inconsistent data state to a consistent data state.

5. The system of claim 1, the one or more computing nodes further configured at least to:
   perform at least one action for rolling back configuration changes in an event that an error occurs while performing the at least one action for configuration at least one of the first computing environment or the second one or more computing environments.

6. A method of configuring one or more computing environments, the method comprising:
   receiving information indicative of one or more user actions for configuring a first computing environment;
   forming a workflow definition comprising information indicative of at least one action for configuring the one or more computing environments, the at least one action based at least in part on the information indicative of one or more user actions for configuring the first computing environment;
   associating one or more translation modules with the information indicative of at least one action for configuring the one or more computing environments;
   invoking, by the one or more translation modules, one or more application programming interface functions corresponding to performing the at least one action for configuring the one or more computing environments; and translating, by the one or more translation modules, one or more behavioral differences of the one or more application programming interface functions, the translating comprising mapping from a first one or more state transitions of the one or more application programming interface functions to a second one or more state transitions of the one or more translation modules.

7. The method of claim 6, further comprising:
storing the workflow definition in a data store comprising a plurality of stored workflow definitions; and
retrieving the workflow definition from the data store, based at least in part on properties of the second computing environment.

8. The method of claim 6, further comprising:
associating one or more parameter values with parameters of the workflow definition, the one or more parameter values based at least in part on properties of the second computing environment.

9. The method of claim 6, wherein the one or more behavioral differences comprise eventual consistency of updates and the first one or more state transitions comprises a transition from an inconsistent data state to a consistent data state.

10. The method of claim 6, further comprising:
performing at least one action for rolling back configuration changes in an event that an error occurs while performing the at least one action for configuring the one or more computing environments.

11. The method of claim 6, further comprising:
defining a dependency between the at least one action for configuring the one or more computing environments and one or more additional actions for configuring the one or more computing environments.

12. The method of claim 6, further comprising:
mapping a first asynchronous state transition of the one or more application programming interface functions to a first synchronous state transition of the translation module, or mapping a second synchronous state transition of the one or more application programming interface functions to a second asynchronous state transition of the translation module.

13. The method of claim 6, wherein the one or more translation modules are functions or methods contained in a code library.

14. The method of claim 6, further comprising:
removing security-sensitive information from the workflow definition; and
publishing the workflow definition.

15. A non-transitory computer-readable storage medium having stored thereon instructions that, upon execution by one or more computing devices, cause the one or more computing devices at least to:
receive information indicative of one or more user actions for configuring a first computing environment;
form a workflow definition comprising information indicative of at least one action for configuring the one or more computing environments, the at least one action based at least in part on the information indicative of one or more user actions for configuring the first computing environment;
associate one or more translation modules with the information indicative of at least one action for configuring the one or more computing environments;
invoke, by the one or more translation modules, one or more application programming interface functions corresponding to performing the at least one action for configuring the one or more computing environments; and
translate, by the one or more translation modules, one or more behavioral differences of the one or more application programming interface functions, the translating comprising mapping from a first one or more state transitions of the one or more application programming interface functions to a second one or more state transitions of the one or more translation modules.

16. The non-transitory computer-readable medium of claim 15, comprising further instructions that, upon execution by the computing device, cause the computing device to at least:
apply, upon a failure to complete the one or more actions for configuring the one or more computing environments, a rollback operation based at least in part on an object identified in the workflow definition.

17. The non-transitory computer-readable medium of claim 15, wherein the first one or more state transitions comprises at least one of an asynchronous state transition of the one or more application programming interface functions or a synchronous state transition of the one or more application programming interface functions.

18. The non-transitory computer-readable medium of claim 15, wherein configuring the one or more computing environments comprises instantiating a virtual computing environment.

19. The non-transitory computer-readable medium of claim 15, wherein the one or more behavioral differences comprise eventual consistency of updates and the first one or more state transitions comprises a transition from an inconsistent data state to a consistent data state.

20. The non-transitory computer-readable medium of claim 15, comprising further instructions that, upon execution by the computing device, cause the computing device to at least:
record the information indicative of one or more user actions based at least in part on calls to a second one or more translation modules, the calls initiated in response to the one or more user actions for configuring a first computing environment.

* * * * *